United States Patent [19]

Martin

[11] 4,251,277

[45] Feb. 17, 1981

[54] COMPOSITIONS CONTAINING THIOFUNCTIONAL POLYSILOXANES

[75] Inventor: Eugene R. Martin, Onsted, Mich.

[73] Assignee: SWS Silicones Corporation, Adrian, Mich.

[21] Appl. No.: 899,195

[22] Filed: Apr. 24, 1978

Related U.S. Application Data

[63] Continuation-in-part of Ser. No. 644,404, Dec. 29, 1975, abandoned.

[51] Int. Cl.$^3$ .............................................. B28B 7/36
[52] U.S. Cl. ............................ 106/38.22; 106/287.13; 252/389 R; 252/382; 252/395; 525/477; 556/429; 260/45.7 S; 528/30

[58] Field of Search ................. 106/38.22, 287.13; 252/389 R, 395 R, 382; 260/448.2 N, 45.7 S, 825; 528/30; 556/429; 525/477

[56] References Cited

U.S. PATENT DOCUMENTS

| | | | |
|---|---|---|---|
| 3,453,234 | 7/1969 | Kookootsedes | 260/46.5 |
| 3,555,067 | 1/1971 | LeGrow | 260/448.2 |
| 3,647,725 | 3/1972 | Nitzsche et al. | 260/18 |
| 3,873,499 | 3/1975 | Michael et al. | 260/46.5 |
| 4,029,827 | 6/1977 | Imperial et al. | 148/6.24 |
| 4,046,795 | 9/1977 | Martin | 260/46.5 |

*Primary Examiner*—Melvyn I. Marquis

[57] ABSTRACT

Compositions containing organopolysiloxanes and thiofunctional polysiloxanes having at least one mercaptan group which are effective as corrosion inhibitors and as release agents for metal substrates.

15 Claims, No Drawings

COMPOSITIONS CONTAINING THIOFUNCTIONAL POLYSILOXANES

This application is a continuation-in-part of pending application Ser. No. 644,404, filed on Dec. 29, 1975 and now abandoned.

This invention relates to novel compositions and more particularly to compositions which are effective as corrosion inhibitors and as release agents for metal substrates. The compositions of this invention which are particularly effective as corrosion inhibitors and release agents for metal substrates contain organopolysiloxanes and thiofunctional polysiloxanes having at least one mercaptan group.

Various compositions have been proposed for treating metal substrates to impart release properties thereto as well as to prevent corrosion and discoloration which is generally associated with corrosion. Among the compositions which have been proposed are organosilicon compounds and compounds containing sulfur. Sulfur containing compounds which have been employed to impart corrosion resistance to metal surfaces are mercaptoalkylsilanes and mercaptoalkyl substituted organopolysiloxanes such as described in U.S. Pat. No. 3,346,405 to Viventi. Other sulfur containing compounds which have been employed in the treatment of metal surfaces are mercaptohydrocarbylpolysiloxanes such as described in British Pat. No. 1,102,251. However, when these sulfur containing compounds are applied to a metal surface to impart release properties and corrosion resistance thereto, they have a tendency to form a residue on the metal surface, especially when heated for a period of time to a temperature of from about 170° to about 240° C. In certain applications, it is desirable to employ compounds which have an affinity for metals such as copper. Since sulfur containing compounds have an affinity for metals such as copper, it would be advantageous to be able to employ these compounds and still avoid the disadvantages of the formation of a residue on the metal surface, especially when heated to elevated temperatures.

Although other materials such as organopolysiloxanes have been employed heretofore as release agents, they do not have the same affinity for metals. e.g., copper, that sulfur containing compounds exhibit.

Therefore, it is an object of this invention to provide a composition having improved release properties. Another object of this invention is to provide a composition which imparts corrosion resistant properties to a metal surface. Still another object of this invention is to provide a composition which has improved affinity for a metal surface. A further object of this invention is to provide a composition which does not leave a residue on the metal surface when heated to an elevated temperature. A still further object of this invention is to provide a composition which is stable at temperatures of from 150° to 250° C. for long periods of time.

The foregoing objects and others which will become apparent from the following description are accomplished in accordance with this invention, generally speaking, by providing a composition comprising (1) an organopolysiloxane fluid and (2) thiofunctional polysiloxanes which have at least one mercaptan group.

Organopolysiloxanes employed in this composition may be represented by the general formula

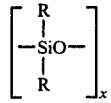

wherein the R(s), which may be the same or different, represent monovalent hydrocarbon radicals or halogenated monovalent hydrocarbon radicals having from 1 to 18 carbon atoms and x is a number greater than 8.

Radicals represented by R above are alkyl radicals, e.g., methyl, ethyl, propyl, butyl, octyl, dodecyl and octadecyl; aryl radicals, e.g., phenyl, diphenyl and naphthyl radicals; cycloalkyl radicals, e.g., cyclobutyl, cyclopentyl and cyclohexyl; alkaryl radicals, e.g., tolyl, xylyl, ethylphenyl and aralkyl radicals, e.g., benzyl, α-phenylethyl, B-phenylethyl and α-phenylbutyl radicals.

Any linear, branched or cyclic organopolysiloxanes having an average of from 1.75 to 2.25 organic radicals per silicon atom may be employed. The organopolysiloxanes may be triorganosiloxy, alkoxy or hydroxy terminated; however they should be free of aliphatic unsaturation. It is preferred that the polysiloxanes have a viscosity of between about 5 and 1,000,000 cs., and more preferably between about 50 cs. and 300,000 cs. at 25° C. Also, it is possible to combine high and low viscosity fluids to form a fluid having the desired viscosity. High molecular weight gums may also be employed, however, it is preferred that these gums be dissolved in an organic solvent before they are combined with the thiofunctional polysiloxanes.

Examples of suitable organopolysiloxanes are trialkylsiloxy endblocked diorganopolysiloxanes such as trimethylsiloxy endblocked dimethylpolysiloxanes, triethylsiloxy endblocked diethylpolysiloxanes; hydroxy terminated diorganopolysiloxanes such as dimethylpolysiloxanes, diethylpolysiloxanes, dipropylpolysiloxanes and alkoxy terminated diorganopolysiloxanes such as methoxy terminated dimethylpolysiloxaes, ethoxy terminated dimethylpolysiloxaes, propoxy terminated organopolysiloxanes containing dimethyl or diethyl or dipropyl siloxanes.

The thiofunctional polysiloxanes employed in the composition of this invention may be prepared by reacting a disiloxane and/or a hydroxy or hydrocarbonoxy containing silane or siloxane with a cyclic trisiloxane in the presence of an acid catalyst in which at least one of the above organosilicon compounds contain a mercaptan group.

Disiloxanes which may be used in this invention may be represented by the formula

while the cyclic siloxanes are represented by the formula

wherein R, which may be the same or different, represents a monovalent hydrocarbon radical or a halogenated monovalent hydrocarbon radical having up to 18 carbon atoms, M is a mercaptan containing group represented by the formulae R'(SR''')$_y$ in which at least one R''' is hydrogen, and

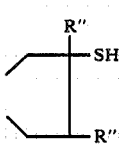

a is a number of from 0 to 5 and y is a number of from 1 to 3.

Suitable examples of organosilicon compounds which may be reacted with the disiloxanes and/or cyclic trisiloxanes are silanes of the general formula

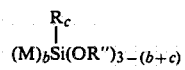      IV or siloxanes of the general formula

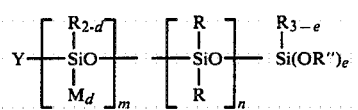      V in which R is a monovalent hydrocarbon radical or a halogenated hydrocarbon radical having from 1 to 18 carbon atoms, M is a thiofunctional group represented by the formula R'(SR''')$_y$, wherein at least one R''' is hydrogen, and

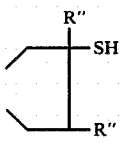

R' is substituted or unsubstituted divalent, trivalent or tetravalent hydrocarbon radicals free of aliphatic unsaturation having from 1 to 18 carbon atoms, hydrocarbon ether, hydrocarbon thioether, hydrocarbon ester and hydrocarbon thioester radicals in which R' is attached to the silicon atom via a silicon carbon bond, R'' is hydrogen or a monovalent hydrocarbon radical having from 1 to 18 carbon atoms, R''' may be the same as R'' or a radical represented by the formula R''''X, wherein X is

—OOCR, OH or a cyanoalkyl radical, R'''' is a devalent hydrocarbon radical free of aliphatic unsaturation having from 1 to 18 carbon atoms, Y is a radical of the formula R$_3$SiO$_{\frac{1}{2}}$, and

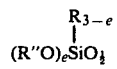

where R and R'' are the same as above, b is a number of from 0 to 3, c is a number of from 0 to 2 and the sum of b+c is from 1 to 2, d is a number of from 0 to 2 and when d is 1 or 2, the sum of a+b+m is at least 1 and when d is 0, the sum of a+b is at least 1, e is a number of from 1 to 3, m and n are each equal to a number of from 0 to 20,000 and the sum of m+n is at least 1.

Examples of suitable monovalent hydrocarbon radicals represented by R are alkyl radicals such as methyl, ethyl, propyl, butyl, pentyl, hexyl, octyl, decyl, octadecyl; aryl radicals such as phenyl, diphenyl and naphthyl; alkaryl radicals such as tolyl, xylyl and ethylphenyl; aralkyl radicals such as benzyl, α-phenylethyl, B-phenylethyl, α-phenylbutyl and cycloalkyl radicals such as cyclobutyl, cyclopentyl and cyclohexyl radicals; halogenated hydrocarbon radicals such as chloromethyl, bromoethyl, fluoroethyl, tetrafluoroethyl, trifluorotolyl, hexafluoroxylyl and the like.

Examples of suitable divalent hydrocarbon radicals represented by R' and R'''' are ethylene, trimethylene, tetramethylene, hexamethylene, octamethylene and the like. Suitable examples of trivalent and tetravalent hydrocarbon radicals are represented by the formulae =CHCH$_2$—, =CHCH$_2$CH$_2$—, =CH(CH$_2$)$_3$—, =CH(CH$_2$)$_4$—, =CH(CH$_2$)$_{17}$—,

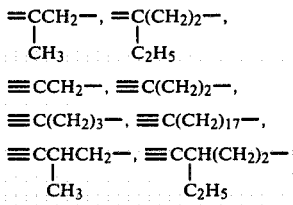

and the like.

Suitable examples of monovalent hydrocarbon radicals represented by R'' are alkyl radicals such as methyl, ethyl, propyl, butyl, pentyl, hexyl, octyl, decyl, octadecyl; aryl radicals such as phenyl, diphenyl and naphthyl; alkaryl radicals such as tolyl, xylyl and ethylphenyl; aralkyl radicals such as benzyl, α-phenylethyl, B-phenylethyl, α-phenylbutyl and cycloalkyl radicals such as cyclobutyl, cyclopentyl and cyclohexyl radicals.

Suitable examples of R'(SR''')$_y$ groups include —CH$_2$SH, —C$_2$H$_4$SH, —C$_3$H$_6$SH, (HSCH$_2$)$_2$CHCH$_2$CH$_2$—, (HSCH$_2$CH$_2$)(HSCH$_2$)CH(CH$_2$)$_4$—, (HSCH$_2$CH$_2$)$_3$CCH$_2$CH$_2$—, (HSCH$_2$CH$_2$)HSCH$_2$)CHCH(CH$_2$SH)CH$_2$CH$_2$CH$_2$—, HS(CH$_2$)$_5$CH(CH$_2$CH$_2$SH)CH$_2$CH$_2$CH(CH$_2$CH$_3$)—, (HSCH$_2$CH$_2$)$_2$CHCH$_2$CH$_2$—, (HSCH$_2$)$_2$CHSCH$_2$CH$_2$CH$_2$—, (HSCH$_2$)$_2$(C$_2$H$_5$)CCH$_2$SCH$_2$CH$_2$CH$_3$—, (HSCH$_2$)$_3$CCH$_2$SCH$_2$CH$_2$CH$_2$13 , (HSCH$_2$)(HSCH$_2$CH$_2$CH$_2$CH$_2$) CHSCH$_2$CH$_2$CH$_2$—, (HSCH$_2$CH$_2$)$_2$CHCH$_2$SCH$_2$CH$_2$CH$_2$—, (HSCH$_2$)$_2$(C$_2$H$_5$)CCH$_2$SCH$_2$CH$_2$S(CH$_2$)$_3$—, (HSCH$_2$)$_3$CCH$_2$S(CH$_2$)$_3$S(CH$_2$)$_3$—,

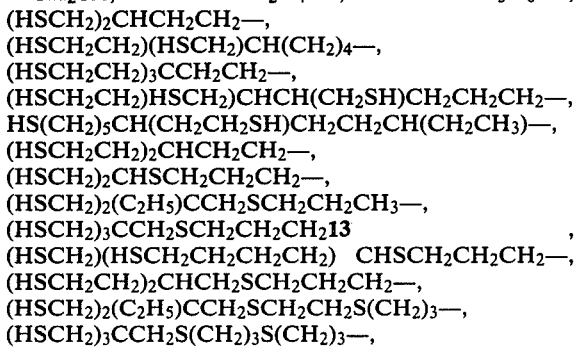

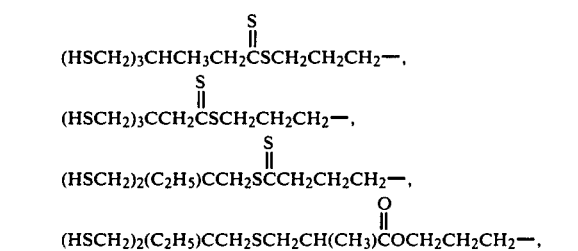

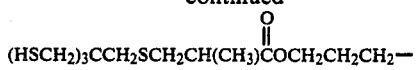

and the like.

Hydroxy and hydrocarbonoxy containing silanes which may be employed are silanes such as 3-mercaptopropyltrimethoxysilane, 2-mercaptoethyltriethoxysilane, w-mercaptodecyltriethoxysilane, 2-mercaptohexyltripropoxysilane, w-mercaptoamyltriethoxysilane, 2-(triethoxysilyl)ethyl butyl thioether, 3-(triethoxysilyl)propyl butyl thioether, 4-(triethoxysilyl)butyl methyl thioether, 2-(methyldiethoxysilyl)ethyl methyl thioether, 2-(methyldiethoxysilyl)ethyl phenyl thioether, 2-(methyldiethoxysilyl)ethyl dodecyl thioether, 6-(trimethoxysilyl)hexyl ethyl thioether, methyltriethoxysilane, dimethyldiethoxysilane, trimethylethoxysilane, dimethylsilane diol, diphenylsilane diol and the like.

The corresponding siloxanes or copolymers thereof which contain at least one or more alkoxy or hydroxy groups may also be employed. Suitable examples of these polysiloxanes are monoethoxy endblocked beta-mercaptoethyl propylpolysiloxane or methyldiethoxysilyl endblocked beta-mercaptobutyl methylpolysiloxane, monohydroxy endblocked beta-mercaptoethyl methylpolysiloxane, dihydroxy endblocked dimethylpolysiloxane, diethoxy endblocked dimethylpolysiloxane and the like.

Other hydroxy and/or hydrocarbonoxy silicon compounds which may be employed as one of the initial reactants with the disiloxane and/or cyclic trisiloxane are the silacyclopentane thiol compounds disclosed in U.S. Pat. No. 3,655,713 to Le Grow.

Examples of suitable disiloxanes are hexamethyldisiloxane, hexaethyldisiloxane, hexapropyldisiloxane, hexoctyldisiloxane, di(3-mercaptopropyl)tetramethyldisiloxane and the like. Examples of suitable cyclic siloxanes are hexamethylcyclotrisiloxane, hexaethylcyclotrisiloxane, hexaphenylcyclotrisiloxane, hexabutylcyclotrisiloxane, hexaoctylcyclotrisiloxane, 1,2,3-trimethyl-1,2,3-triphenylcyclotrisiloxane and the like.

Catalysts which may be employed in affecting the reaction between a disiloxane and/or a hydroxy and/or hydrocarbonoxy containing silane or siloxane and a cyclic trisiloxane in which at least one of the reactants contains a mercaptan group are acid clays and organic and inorganic acids having a pK value less than 1.0 and more preferably below 0.7 in aqueous solutions. Suitable acid catalysts which may be employed are benzosulfonic acid, para-toluene-sulfonic acid, sulfuric acid, sulfurous acid, nitric acid, perchloric acid, hydrochloric acid and acid clays such as Filtrol No. 13 and No. 24 (available from Filtrol Corporation).

Although the amount of catalyst is not critical, it is preferred that from about 0.003 percent up to about 10 percent by weight of catalyst based on the total weight of the reactants, i.e., the silicon containing compounds used in the preparation of the thiofunctional polysiloxanes be employed. Greater amounts of catalyst may be used; however, it is the intent of this invention to provide a catalyst system which does not alter the functionality of the resultant composition.

Generally, it is desirable to remove or destroy the catalysts after the reaction is complete because their presence will adversely affect the properties of the resulting composition. The catalysts may be removed, for example, by washing with water or they may be destroyed by neutralizing with basic reagents. In addition, certain catalysts, such as acid clays, may be removed by filtering the reaction mixture.

The reactions may be conducted at any temperature ranging from about 25° C. up to about 200° C. over a period of time ranging from 0.5 hour up to several days and, if desired, in the presence of a hydrocarbon solvent. Under certain conditions, for example, when an anhydrous acid catalyst is employed, a catalytic amount of a protic compound is required to effect the reaction. The term protic compound refers to compounds having a reactive hydrogen such as alcohols, e.g., methanol, ethanol, propanol, butanol and water. The amount of protic compound is not critical and may range from about 0.0001 to about 10 percent based on the total weight of the silicon containing reactants.

The reaction may be conducted at atmospheric, subatmospheric or superatmospheric pressure in the absence of a solvent; however, when a solvent is employed, it may be employed in an amount of from about 1 to 50 percent by weight based on the silicon containing reactants. Examples of suitable hydrocarbon solvents are heptane, benzene, toluene, xylene and the like. It is, however, preferred that the reaction be conducted in an inert atmosphere.

Other thiofunctional polysiloxanes which may be employed in the release compositions of this invention are siloxane copolymers containing from 0.1 to 99.9 mol percent of siloxane units of the formula

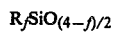   VI and from 99.9 to 0.1 mol percent of siloxane units containing at least one mercaptan group which may be represented by the general formula

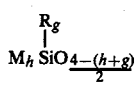   VII in which R is the same as above, M is a mercaptan group of the formula R'(SR''')$_y$, in which at least one R''' is hydrogen, f is 0, 1 or 2, g is 0, 1 or 2 and h is 1, 2 or 3 and y is a number of from 1 to 3. However when M is a divalent radical of the formula

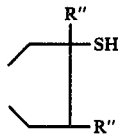

then the siloxane units containing at least one mercaptan group are represented by the formula

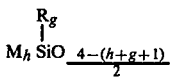   VIII where R is the same as above, g is 0 or 1, h is 1 and the sum of g+h is 1 or 2. These copolymers may also contain R''O and R$_3$SiO units in which R and R'' are the same as above.

These thiofunctional polysiloxanes can be prepared by reacting hydroxy containing polysiloxanes with silanes containing mercaptan groups or by the cohydrolysis of chloroalkylchlorosilanes, dialkyldichlorosilanes and trimethylchlorosilanes and thereafter reacting the chloroalkyl groups with sulfur containing compounds to form polysiloxanes having mercaptan functionality. Thiofunctional polysiloxanes such as those described in U.S. Pat. No. 3,346,405 to Viventi in which w-chloralkyl containing polysiloxanes are reacted with sodium sulfohydride in the presence of dimethylformamide may be employed in the compositions of this invention. Other thiofunctional polysiloxanes which may be employed in the compositions of this invention are those prepared in accordance with U.S. Pat. No. 2,960,492 to Morton and U.S. Pat. No. 3,388,144 to Musolf et al.

The compositions of this invention can contain from 0.1 percent to 90 percent by weight of thiofunctional polysiloxanes and from 10 percent to about 99.9 percent by weight of organopolysiloxanes. It is preferred that the composition contain from about 1.0 to about 30 percent by weight of the thiofunctional polysiloxanes and from 70 percent to 99 percent by weight of the organopolysiloxanes based on the weight of the thiofunctional polysiloxanes and the organopolysiloxanes.

Although it is not essential, the composition of this invention may be diluted with organic solvents to form a solution containing from 0.1 percent to 99 percent and more preferably from 1.0 to 20 percent by weight based on the weight of the composition, i.e., solvent and the siloxanes. Suitable examples of organic solvents are aliphatic hydrocarbons such as hexane, heptane, octane; aromatic hydrocarbons such as benzene, toluene, xylene, ethylbenzene, naphtha, halogenated hydrocarbons such as methylene chloride, perchloroethylene, trichloroethylene, carbon tetrachloride, ethers and polyethers such as diethyl ether, dimethyl ether, dibutyl ether, diethylene glycol dimethyl ether, diethylene glycol diethyl ether and the like. Preferably the solvent employed in this invention is methylene chloride or perchloroethylene.

Metals and alloys which may be treated with the composition of this invention are those below and including magnesium in the electromotive series. The metals and alloys include aluminum, brass, bronze, copper, chromium, iron, magnesium, nickel, lead, silver, silverplate, sterling silver, tin, beryllium, bronze and zinc.

Any method known in the art may be employed to apply the composition of this invention to a metal surface as long as it results in the deposition of a continuous film. The composition may be applied to the metal surface by dipping, spraying, wiping or brushing. The coated surface may be used immediately or may be heated to an elevated temperature such as, for example, from 100° to about 300° C. The heating step accelerates the rate of reaction of the release coating with the metal surface, thereby improving the passivating effect of the coating in certain applications.

The thickness of the coating applied to the metal surface is not critical and may vary from a very thin film to a relatively heavy coat such as those in excess of 0.1 inch. A coating thickness ranging from about 0.01 to 0.10 inch is preferred, although from an economic point of view, a thin film having a thickness of only a few Angstrom units can be employed. Generally, the thickness of the coating can be regulated by the mode of application.

The composition of this invention may be applied to metal substrates which are used for molding thermal plastic and thermosetting materials such as polyurethanes, polyethylene, epoxy resins and the like.

Polyurethanes which are well known in the art are prepared by reacting an organic compound having at least two active hydrogen atoms as determined by the Zerewitinoff method with a polyisocyanate. Other reactants, such as chain extending agents and gas-generating materials may also be employed, depending on the particular polyurethane article desired. For example, in the formation of cellular materials, gas-generating materials, such as water, are generally incorporated in the composition.

Suitable examples of polyisocyanates are diisocyanates such as alkylene diisocyanates, e.g., hexamethylene diisocyanate and decamethylene diisocyanate, and arylene diisocyanates, e.g., phenylene diisocyanates, toluene diisocyanates and mixtures thereof.

Compounds having two or more hydrogen atoms as determined by the Zerewitinoff method are polyalkylene polyols such as polyesters, polyethers, alkylene glycols, polymercaptans, polyamines and the like.

The composition of this invention may be used as a release agent for molding epoxy resins. These compounds have an oxirane epoxy equivalency greater than one, that is, compounds having an average of more than one oxirane epoxy group, e.g.,

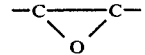

per molecule. The epoxy containing compounds in which the oxygen of the epoxy group is attached to vicinal carbon atoms, can be saturated or unsaturated, aliphatic, cycloaliphatic, or heterocyclic, and can be substituted with substituents such as halogen atoms, alkyl groups, ether groups and the like.

Examples of suitable polyepoxides are the polyglycidyl ethers of polyhydric phenols, polyglycidyl ethers of the bis(hydroxyphenyl)alkanes, polyglycidyl ethers of polyhydric alcohols, polyglycidyl esters of polycarboxylic acids, polyglycidyl derivatives of aromatic amines and aminophenols.

These polyepoxides are reacted with curing agents to form hard insoluble infusible products. The curing agents for the products include materials which are preferably acidic or basic such as poly basic acids and their anhydrides, acids which contain sulfur, nitrogen, phosphrous or halogens and bases such as amine-containing compounds.

Other curing agents which may be used in curing the epoxy resins are boron trifluoride and complexes of boron trifluoride with amines, ethers, phenols and the like, Friedel-Crafts metal salts such as aluminum chloride, zinc chloride, and other salts, such as zinc fluoborate, magnesium perchlorate and zinc fluosilicate; inorganic acids and partial esters as phosphoric acid and partial esters thereof including n-butyl orthothiophosphate, diethyl orthophosphate and hexaethyltetraphosphate and polyamides containing active amine and/or carboxyl groups.

The thermosetting or thermal plastic materials are applied to a mold whose surface has been coated with the release composition of this invention and the plastic materials are cured at temperatures ranging from room temperature up to about 250° C.

In certain applications such as in the molding of polyurethane parts, the thiofunctional polysiloxane compositions, when used as the sole release agent impart satisfactory release properties. However, these compositions have the disadvantage of forming a residue on the mold surface which either has to be removed or the mold has to be discarded. Thus, a considerably economic advantage is obtained by employing the compositions of this invention. Furthermore, when the thiofunctional polysiloxane compositions are used as the sole release agent at temperatures of from 150° to 200° C. on metal substrates the rate of formation of the residue substantially increases and the residue either decreases the release properties or deforms the surface of the released part. This phenomena is especially apparent when the thiofunctional polysiloxanes are compared with the compositions of this invention as fuser oils for duplicating machines. The thiofunctional polysiloxanes, when used as the sole release agent, form a residue which causes smearing and streaking on the resultant copy. However, almost perfect copies are obtained when the compositions of this invention are employed.

The embodiments of this invention are further illustrated by the following examples in which all parts are by weight unless otherwise specified.

EXAMPLE 1

A thiofunctional polysiloxane is prepared by adding 28.2 parts of 3-mercaptopropyltrimethoxysilane, 0.5 part of water, and 25.5 parts of Filtrol No. 13 acid clay (available from Filtrol Corporation) to a reaction vessel containing 1276 parts of hexamethylcyclotrisiloxane heated to 70° C. The vessel is heated to 100° C. and maintained at this temperature for three hours. The contents of the vessel are then cooled to 60° C. and filtered. The volatiles are stripped off for 8 hours at 200° C. at less than 1 torr. A clear, transparent liquid is obtained having a viscosity of 100 cs. at 25° C. Nuclear Magnetic Resonance (NMR) analysis shows that the product has a mol ratio of $CH_3O:HSC_3H_6:Si(CH_3)_2$ of 3:1:100. The SH content of the product is about 0.43 percent.

The resultant composition is applied as a thick film to metal panels and a layer of Epoxical Urethane No. 1850 Foam "B" Pak, (available from U.S. Gypsum) is then applied to the coated panels. The panels are than heated in a forced air oven at 100° C. for two minutes, then removed from the oven and cooled. Adhesion of the urethane to the coated panels is then determined. The results are illustrated in Table I. After repeated applications, a build up of residue is observed on the mold surface.

EXAMPLE 2

A mercaptofunctional fluid is prepared by adding 39.2 parts of 3-mercaptopropyltrimethoxysilane to a reaction vessel containing 592 parts of a hydroxyl terminated dimethylpolysiloxane having a viscosity of 350 cs. at 25° C. and containing 2.43 percent by weight of hydroxyl groups. The reactants are heated to 200° C. for one hour and then vacuum stripped for two hours at 200° C. at less than 1 torr. A clear product having a viscosity of 72.1 cs. at 25° C. is obtained which by Nuclear Magnetic Resonance has a ratio of $CH_3O:HSC_3H_6:Si(CH_3)_2$ of 1.58:1.0:32.4. The percent of SH is about 0.79 percent.

The resultant composition is applied as a thick film to metal panels and a layer of Epoxical Urethane No. 1850 Foam "B" Pak (available from U.S. Gypsum) is then applied to the coated panels. The panels are then placed in a forced air oven at 100° C. for two minutes, then removed from the oven and cooled. Adhesion of the urethane to the coated panels is determined. The results are shown in Table I. After repeated applications, a build up of residue on the coated panels is observed.

EXAMPLE 3

About 100 parts of the mercaptofunctional fluid prepared in accordance with Example 1 are mixed with 900 parts of a trimethylsiloxy-endblocked dimethylpolysiloxane having a viscosity of 350 cs. at 25° C.

The resultant composition is applied as a film to metal panels and a layer of Epoxical Urethane No. 1850 Foam "B" Pak (available from U.S. Gypsum) is then applied to the coated panels. The panels are then placed in a forced air oven at 100° C. for two minutes, then removed from the oven and cooled. Adhesion of the urethane to the coated panels is determined. The results are shown in Table I. After repeated applications no residue build up is observed on the surface.

EXAMPLE 4

About 100 parts of the mercaptofunctional fluid prepared in accordance with Example 2 are mixed with 900 parts of a trimethylsiloxy-endblocked dimethylpolysiloxane having a viscosity of 350 cs. at 25° C.

The resultant composition is applied as a film to metal panels and a layer of Epoxical Urethane No. 1850 Foam "B" Pak (available from U.S. Gypsum) is then applied to the coated panels. The panels are then placed in a forced air oven at 100° C. for two minutes, then removed from the oven and cooled. Adhesion of the urethane to the coated panels is determined. The results are shown in Table I.

EXAMPLE 5

(a) In a comparison example, trimethylsiloxy-endblocked dimethylpolysiloxane (350 cs. at 25° C.) is applied to the metal panels. A layer of Epoxical Urethane No. 1850 Foam "B" Pak (available from U.S. Gypsum) is then applied to the coated panels The panels are then placed in a forced air oven at 100° C. for two minutes, then removed from the oven and cooled. Adhesion of the urethane to the coated panels is determined. The results are shown in Table I.

(b) A layer of Epoxical Urethane No. 1850 Foam "B" (available from U.S. Gypsum) is applied to uncoated metal panels. The panels are then placed in a forced air oven at 100° C. for two minutes, then removed from the oven and cooled. Adhesion of the urethane to the coated panels is determined. The results are shown in Table I.

EXAMPLE 6

The procedure of Example 1 is repeated except that a film of the thiofunctional fluid prepared in accordance with Example 1 is applied to the panels and the coated panels are then heated to 200° C. for 2 hours and cooled to room temperature prior to the application of the urethane layer. Although the urethane is readily removed from the metal panels, a build up of residue on the panels is observed.

EXAMPLE 7

The procedure of Example 2 is repeated except that a film of the thiofunctional fluid prepared in accordance with Example 2 is applied to the panels and the coated panels are then heated to 200° C. for 2 hours and cooled to room temperature prior to the application of the urethane layer. Although the urethane is readily removed from the metal panels, a build up of residue is observed on the panels.

EXAMPLE 8

The procedure of Example 3 is repeated except that the panels are coated with a film of the blend of Example 3 and heated to 200° C. for 2 hours and then cooled prior to the application of the urethane layer. Excellent release properties are observed without any trace of residue build up on the panels.

EXAMPLE 9

The procedure of Example 4 is repeated except that the panels are coated with a film of the blend of Example 4 and heated to 200° C. for 2 hours and then cooled prior to the application of the urethane layer. Excellent release properties are observed without any trace of residue build up on the panels.

EXAMPLE 10

The procedure of Example 3 is repeated except that 90 parts of the thiofunctional fluid is mixed with 10 parts of a trimethylsiloxy-endblocked dimethylpolysiloxane fluid (100 cs. at 25° C.) and applied to a metal substrate. Again excellent release properties are observed between a urethane layer applied thereto and the coated metal substrate. No residue build up is observed on the metal substrate after repeated applications.

EXAMPLE 11

The composition prepared in accordance with Example 3 is applied to the surface of a metal mold. An epoxy resin containing the following ingredients is poured into the coated mold and heated to 100° C. for about 2 hours and then increased to 160° C. for 6 hours. The epoxy resin is easily released from the mold.

| Ingredients | Parts |
| --- | --- |
| Diglycidylether of 2,2-bis(p-hydroxyphenyl)pentane having an epoxy equivalency of 181 | 100.0 |
| Piperidine | 2.0 |
| Methyl-endomethylene tetrahydrophthalic anhydride | 85.0 |

Good release properties are observed even after making several castings of the epoxy resin in the same mold without the application of additional releast agent. Again, residue build up is not observed on the mold surface.

EXAMPLE 12

The procedure of Example 11 is repeated except that the composition prepared in accordance with Example 4 is applied to the surface of a metal mold. A composition containing the following ingredients is applied to the coated mold and heated to a temperature of 150° C. for 2 hours.

| Ingredients | Parts |
| --- | --- |
| Liquid epoxy resin (available from Union Carbide Corporation as "ERL-2774") | 100.0 |
| Tetrapropenyl succinc anhydride (prepared by heating together equimolar proportions of maleic anhydride and the tetramer of propylene) | 150.0 |
| Dimethylbenzylamine | 1.5 |

The liquid epoxy resin is a polyglycidyl ether of a polyhydric phenol prepared from epichlorohydrin and bisphenol and has a Durrans melting point of 10° C., an epoxy value of about 0.52 epoxide equivalent per 100 grams and a hydroxyl value of about 0.08 hydroxyl equivalent per 100 grams.

The solid resin coating thus formed is easily removed from the mold.

The above process is repeated several times and each time the solid casting is easily removed from the mold without a trace of residue build up on the mold surface.

EXAMPLE 13

The process of Example 1 is repeated except that 31 parts of 2-mercaptoethyltriethoxysilane is substituted for 3-mercaptopropyltrimethoxysilane. The resultant product has a viscosity of about 95 cs. at 25° C. Nuclear Magnetic Resonance (NMR) analysis of the product shows that the ratio of $C_2H_5O:HSC_2H_5:Si(CH_3)_2$ is 3:1:96. The percent of SH in the product is about 0.41 percent.

The product was applied to a copper substrate and then a polyurethane layer was applied to the coated substrate. Excellent release properties were obtained; however a gelatinous residue was observed after repeated applications of the polyurethane layer on the copper substrate.

EXAMPLE 14

Two copper panels are thoroughly cleaned with a commercial polishing compound. To one panel is applied the composition of Example 3 and the excess is removed. In this manner, the non-treated panel serves as a control. Both panels are placed in a humid $H_2S$ chamber which consists of an aqueous solution of sodium sulfide to which dilute formic acid is periodically added. Within 20 minutes, the untreated panel is badly discolored. The treated panel shows no evidence of discoloration.

Although specific embodiments of the invention have been described, it should not be limited to the particular compositions described therein, but is intended to include all modifications within the spirit and scope of this invention.

TABLE 1

| | COPPER PANELS RELEASE PROPERTIES AFTER EACH URETHANE APPLICATION | | | ALUMINUM PANELS RELEASE PROPERTIES AFTER EACH URETHANE APPLICATION | | | COLD ROLLED STEEL PANELS RELEASE PROPERTIES AFTER EACH URETHANE APPLICATION | | |
| --- | --- | --- | --- | --- | --- | --- | --- | --- | --- |
| Ex. No. | No. 1 | No. 2 | No. 3 | No. 1 | No. 2 | No. 3 | No. 1 | No. 2 | No. 3 |
| 1 | Exc. | Exc. | Exc. | Exc. | Exc. | Exc. | Exc. | Exc. | Exc. |
| 2 | Good | Poor | — | Exc. | Good | Poor | Exc. | Exc. | Good |
| 3 | Exc. | Exc. | Exc. | Exc. | Exc. | Exc. | Exc. | Exc. | Exc. |
| 4 Com- | Good | Poor | — | Good | Good | Fair | Exc. | Good | Good |

| | COPPER PANELS RELEASE PROPERTIES AFTER EACH URETHANE APPLICATION | | | ALUMINUM PANELS RELEASE PROPERTIES AFTER EACH URETHANE APPLICATION | | | COLD ROLLED STEEL PANELS RELEASE PROPERTIES AFTER EACH URETHANE APPLICATION | | |
|---|---|---|---|---|---|---|---|---|---|
| Ex. No. | No. 1 | No. 2 | No. 3 | No. 1 | No. 2 | No. 3 | No. 1 | No. 2 | No. 3 |
| Comparison Example 5(a) | Poor | — | — | Poor | — | — | Poor | — | — |
| Comparison Example 5(b) | Poor | — | — | Poor | — | — | Poor | — | — |

What is claimed is:

1. A composition containing (1) an organopolysiloxane which is free of aliphatic unsaturation and has from 1.75 to 2.25 organic radicals per silicon atom and (2) a thiofunctional polysiloxane fluid having at least one mercaptan group per molecule, said organopolysiloxane (1) being present in an amount of from 10 to 99.9 percent by weight and said thiofunctional polysiloxane fluid (2) being present in an amount of from 90 to 0.1 percent by weight based on the weight of the organopolysiloxane (1) and the thiofunctional polysiloxane fluid (2), said thiofunctional polysiloxane fluid (2) contains siloxane copolymers having from 0.1 to 99.9 mol percent of units of the formula $$M_h \underset{|}{\overset{R_g}{Si}} O_{\frac{4-(h+g)}{2}}$$

and from 99.9 to 0.1 mol percent of at least one other siloxane unit having the general formula $$R_f SiO_{\frac{4-f}{2}}$$

wherein R is selected from the group consisting of a monovalent hydrocarbon radical and a halogenated monovalent hydrocarbon radical, each having from 1 to 18 carbon atoms, M is a mercaptan containing radical of the formula $R'(SR''')_y$, R' is selected from the group consisting of a substituted and unsubstituted divalent, trivalent and tetravalent hydrocarbon radical, a hydrocarbon ether, a hydrocarbon thioether, a hydrocarbon ester and a hydrocarbon thioester in which R' is attached to a silicon atom via a silicon-carbon-bond, R''' is selected from the group consisting of hydrogen, a monovalent hydrocarbon radical and a radical represented by the formula R''''X, wherein X is a radical selected from the group consisting of $$\underset{\text{HC}-}{\overset{O}{\underset{\|}{\text{ }}}}, \underset{\text{OCR},}{\overset{O}{\underset{\|}{\text{ }}}}$$

OH and a cyanoalkyl radical, R'''' is a divalent hydrocarbon radical free of aliphatic unsaturation having from 1 to 18 carbon atoms, and at least one R''' is hydrogen, f is 0, 1 or 2, g is 0, 1 or 2, h is 1, 2 or 3, and y is a number of from 1 to 3.

2. A composition containing (1) an organopolysiloxane which is free of aliphatic unsaturation and has from 1.75 to 2.25 organic radicals per silicon atom and (2) a thiofunctional polysiloxane fluid having at least one mercaptan group per molecule, said organopolysiloxane (1) being present in an amount of from 10 to 99.9 percent by weight and said thiofunctional polysiloxane fluid (2) being present in an amount of from 90 to 0.1 percent by weight based on the weight of the organopolysiloxane (1) and the thiofunctional polysiloxane fluid (2), said thiofunctionalpolysiloxane fluid (2) contains siloxane copolymers having from 0.1 to 99.9 mol percent of units of the formula $$M_h \underset{|}{\overset{R_g}{Si}} O_{\frac{4-(h+g+1)}{2}}$$

and from 99.9 to 0.1 mol percent of at least one other siloxane unit having the general formula $$R_f SiO_{(4-f)/2}$$

wherein R is selected from the group consisting of a monovalent hydrocarbon radical and a halogenated monovalent hydrocarbon radical each having from 1 to 18 carbon atoms, M is a mercaptan containing radical of the formula

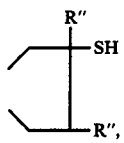

R'' is selected from the group consisting of hydrogen and a monovalent hydrocarbon radical, f is 0, 1 or 2, g is 0 or 1, h is 1 and the sum of g+h is 1 or 2.

3. A composition containing (1) an organopolysiloxane which is free of aliphatic unsaturation and has from 1.75 to 2.25 organic radicals per silicon atom and (2) a thiofunctional polysiloxane fluid having at least one mercaptan group per molecule, said organopolysiloxane (1) being present in an amount of from 10 to 99.9 percent by weight and said thiofunctional polysiloxane fluid (2) being present in an amount of from 90 to 0.1 percent by weight based on the weight of the organopolysiloxane (1) and the thiofunctional polysiloxane fluid (2), said thiofunctional polysiloxane fluid (2) is obtained from the reaction of a cyclic trisiloxane of the formula $$M_a R_{(6-a)} Si_3 O_3$$

with a silicon compound in the presence of an acid catalyst having a pKa value below 1, said silicon compound is selected from the class consisting of silanes of the formula

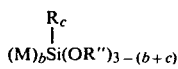

and siloxanes of the formula

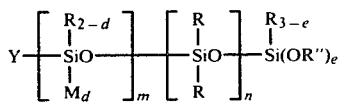

wherein R is selected from the group consisting of a monovalent hydrocarbon radical and a halogenated monovalent hydrocarbon radical, each having from 1 to 18 carbon atoms, M is selected from the class consisting of $R'(SR''')_y$, and

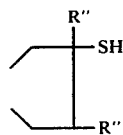

in which R' is selected from the group consisting of a substituted and unsubstituted divalent, trivalent and tetravalent hydrocarbon radical having from 1 to 18 carbon atoms, a hydrocarbon ether, a hydrocarbon thioether, a hydrocarbon ester and a hydrocarbon thioester, in which R' is attached to a silicon atom via a silicon-carbon bond, R" is selected from the group consisting of hydrogen and a monovalent hydrocarbon radical having from 1 to 18 carbon atoms, R''' is selected from the group consisting of R" and a radical represented by the formula R''''X, wherein X is a radical selected from the group consisting of

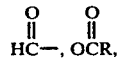

OH and a cyanoalkyl radical, in which R'''' is a divalent hydrocarbon radical free of aliphatic unsaturation having from 1 to 18 carbon atoms, Y is a radical selected from the class consisting of $R_3SiO_{1/2}$, and

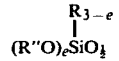

where R and R" are the same as above, and when M is $R'(SR''')_y$, at least one R''' is hydrogen, a is a number of from 0 to 6, b is a number of from 0 to 3, c is a number of from 0 to 2 and the sum of b+c is from 1 to 2, d is a number of from 0 to 2 and when d is 1 or 2 the sum of a+b+m is at least 1 and when d is zero, the sum of a+b is at least 1, e is a number of from 1 to 3, m and n are each equal to a number of from 0 to 20,000 and the sum of m+n is at least 1 and y is a number of from 1 to 3.

4. The composition of claim 3 wherein an organodisiloxane is included in the preparation of the thiofunctional polysiloxane fluid, said organodisiloxane having the formula

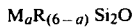

wherein R is a monovalent hydrocarbon radical having from 1 to 18 carbon atoms, M is selected from the class consisting of $R'(SR''')_y$, and

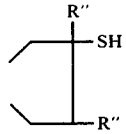

wherein R' is selected from the group consisting of a substituted and unsubstituted divalent, trivalent and tetravalent hydrocarbon radical having from 1 to 18 carbon atoms, a hydrocarbon ether, a hydrocarbon thioether, a hydrocarbon ester, and hydrocarbon thioester, in which R' is attached to a silicon atom via a silicon-carbon bond, R" is selected from the group consisting of hydrogen and a monovalent hydrocarbon radical having from 1 to 18 carbon atoms, R''' is selected from the group consisting of R" and a radical represented by the formula R''''X, wherein X is a radical selected from the group consisting of

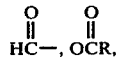

OH and a cyanoalkyl radical, R'''' is a divalent hydrocarbon radical free of aliphatic unsaturation having from 1 to 18 carbon atoms, and when M is $R'(SR''')_y$, at least one R''' is hydrogen, a is a number of from 0 to 6 and y is a number of from 1 to 3.

5. The composition of claim 3, wherein the thiofunctional polysiloxane fluid is prepared in the presence of a hydrocarbon solvent.

6. The composition of claim 5 wherein the solvent is heptane.

7. The composition of claim 3, wherein the thiofunctional polysiloxane fluid is prepared at a temperature up to 200° C.

8. The composition of claim 3, wherein the thiofunctional polysiloxane fluid is prepared in the presence of a protic compound.

9. The composition of claim 4, wherein the organodisiloxane is hexamethyldisiloxane.

10. The composition of claim 4, wherein the disiloxane is di(3-mercaptopropyl)tetramethyldisiloxane.

11. The composition of claim 3, wherein the cyclic trisiloxane is hexamethylcyclotrisiloxane.

12. The composition of claim 3, wherein the silicon compound is a mercaptoalkylhydrocarbonoxysilane.

13. The composition of claim 3, wherein the silicon compound is mercaptopropyltrimethoxysilane.

14. The composition of claim 1 or claim 2 which contains an inert organic solvent.

15. The composition of claim 2 or claim 3 wherein the organopolysiloxane (1) is a polydimethylsiloxane fluid.

* * * * *